(12) United States Patent
Oguri (10) Patent No.: US 9,194,471 B2
(45) Date of Patent: Nov. 24, 2015

(54) AUTOMATIC TRANSMISSION

(75) Inventor: Kazuo Oguri, Hiroshima (JP)

(73) Assignee: JATCO LTD, Fuji-Shi (JP)

( * ) Notice: Subject to any disclaimer, the term of this patent is extended or adjusted under 35 U.S.C. 154(b) by 689 days.

(21) Appl. No.: 13/398,202

(22) Filed: Feb. 16, 2012

(65) Prior Publication Data

US 2012/0244985 A1    Sep. 27, 2012

(30) Foreign Application Priority Data

Mar. 25, 2011    (JP) ................. 2011-067178

(51) Int. Cl.
*F16H 37/02* (2006.01)
*F16H 37/08* (2006.01)
*F16H 3/66* (2006.01)

(52) U.S. Cl.
CPC .............. *F16H 37/022* (2013.01); *F16H 3/663* (2013.01); *F16H 37/0846* (2013.01); *F16H 2037/023* (2013.01); *F16H 2037/026* (2013.01); *F16H 2200/2005* (2013.01); *F16H 2200/2035* (2013.01)

(58) Field of Classification Search
CPC .............. F16H 37/0846; F16H 37/088; F16H 2037/023; F16H 2037/025; F16H 2037/026; F16H 2037/028; F16H 2037/088; F16H 2037/0886; F16H 2037/0893; F16H 9/26; F16H 3/663; F16H 2200/2023; F16H 2200/2035; F16H 2200/2005; F16H 2200/0034

USPC .................................... 475/210, 211
See application file for complete search history.

(56) References Cited

U.S. PATENT DOCUMENTS 5,092,434 A * 3/1992 Smith ............................. 477/39
8,733,209 B2    5/2014 Schneider et al.
2010/0113211 A1    5/2010 Schneider et al.

FOREIGN PATENT DOCUMENTS

| CN | 101649895 A | 2/2010 |
|----|-------------|--------|
| CN | 101663507 A | 3/2010 |
| JP | 01-169169 A | 7/1989 |
| JP | 3861599 B2 | 12/2006 |

* cited by examiner

*Primary Examiner* — Colby M Hansen
(74) *Attorney, Agent, or Firm* — Foley & Lardner LLP (57) ABSTRACT

An automatic transmission includes a continuously variable transmission mechanism, a planetary gear mechanism, a clutch causing an input shaft and a first rotation element to be engaged, a coupling member which transmits rotation of the input shaft to the first rotation element, and a brake which locks rotation of a third rotation element. The input shaft is coupled to an input unit. An output shaft is coupled to a second rotation element An output unit is coupled to a fourth rotation element. The constant speed ratio of the coupling member is so set that a rotation direction of the output shaft relative to the fourth rotation element changes from a forward direction to a reverse direction according to a change in a speed ratio of the continuously variable transmission mechanism when the clutch is engaged and the brake is released.

3 Claims, 6 Drawing Sheets

| drive modes | clutch L&/RC | brake Hi/B |
|---|---|---|
| reverse mode (R) | ○ | |
| neutral mode (N) | ○ | |
| low-speed forward mode (Low) | ○ | |
| high-speed forward mode (High) | | ○ |

AUTOMATIC TRANSMISSION

This application claims priority based on Japanese Patent Application No. 2011-67178, filed with the Japan Patent Office on Mar. 25, 2011, the entire content of which is incorporated into this specification by reference.

FIELD OF THE INVENTION

The present invention relates to an automatic transmission with a continuously variable transmission mechanism and a planetary gear mechanism.

BACKGROUND OF THE INVENTION

An automatic transmission called an IVT (Infinite Variable Transmission) can infinitely change a speed ratio by combining a continuously variable transmission mechanism capable of continuously changing a speed ratio and a planetary gear mechanism.

JP1-169169A discloses an automatic transmission with two planetary gear sets and three friction elements. This automatic transmission can realize a forward first mode, a forward second mode and a reverse mode by switching engaged states of the respective friction elements.

SUMMARY OF THE INVENTION

Since the above automatic transmission needs to include the friction element exclusively provided for the reverse mode to realize the reverse mode, cost increases and the transmission becomes larger.

An object of this invention is to enable reverse drive without providing a friction element exclusively used for reverse drive in an automatic transmission capable of infinitely changing a speed ratio.

According to an aspect of the present invention, an automatic transmission which changes a rotational speed of an input shaft and transmits rotation of the input shaft to an output shaft is provided. The transmission comprises a continuously variable transmission mechanism which continuously changes a rotational speed ratio of an input unit to an output unit; a planetary gear mechanism including at least four rotation elements shown in the order of a first rotation element, a second rotation element, a third rotation element and a fourth rotation element on a speed diagram; a clutch which causes the input shaft and the first rotation element to be engaged; a coupling member which changes the rotational speed of the input shaft at a constant speed ratio and transmits the rotation of the input shaft to the first rotation element via the clutch; and a brake which locks rotation of the third rotation element.

The input shaft is coupled to the input unit. The output shaft is coupled to the second rotation element. The output unit is coupled to the fourth rotation element. The constant speed ratio of the coupling member is so set that a rotation direction of the output shaft relative to the fourth rotation element changes from a forward direction to a reverse direction according to a change in the speed ratio of the continuously variable transmission mechanism when the clutch is engaged and the brake is released.

According to the above aspect, the rotation direction of the output shaft can be changed from the forward direction to the reverse direction relative to the fourth rotation element by setting the clutch in the engaged state and changing the speed ratio of the continuously variable transmission mechanism. Thus, forward and reverse drives can be enabled without providing a friction element exclusively used for reverse drive.

Embodiments and advantages of this invention will be described in detail below with reference to the attached figures.

DESCRIPTION OF THE PREFERRED EMBODIMENTS

First, a first embodiment is described.

Figure 1:
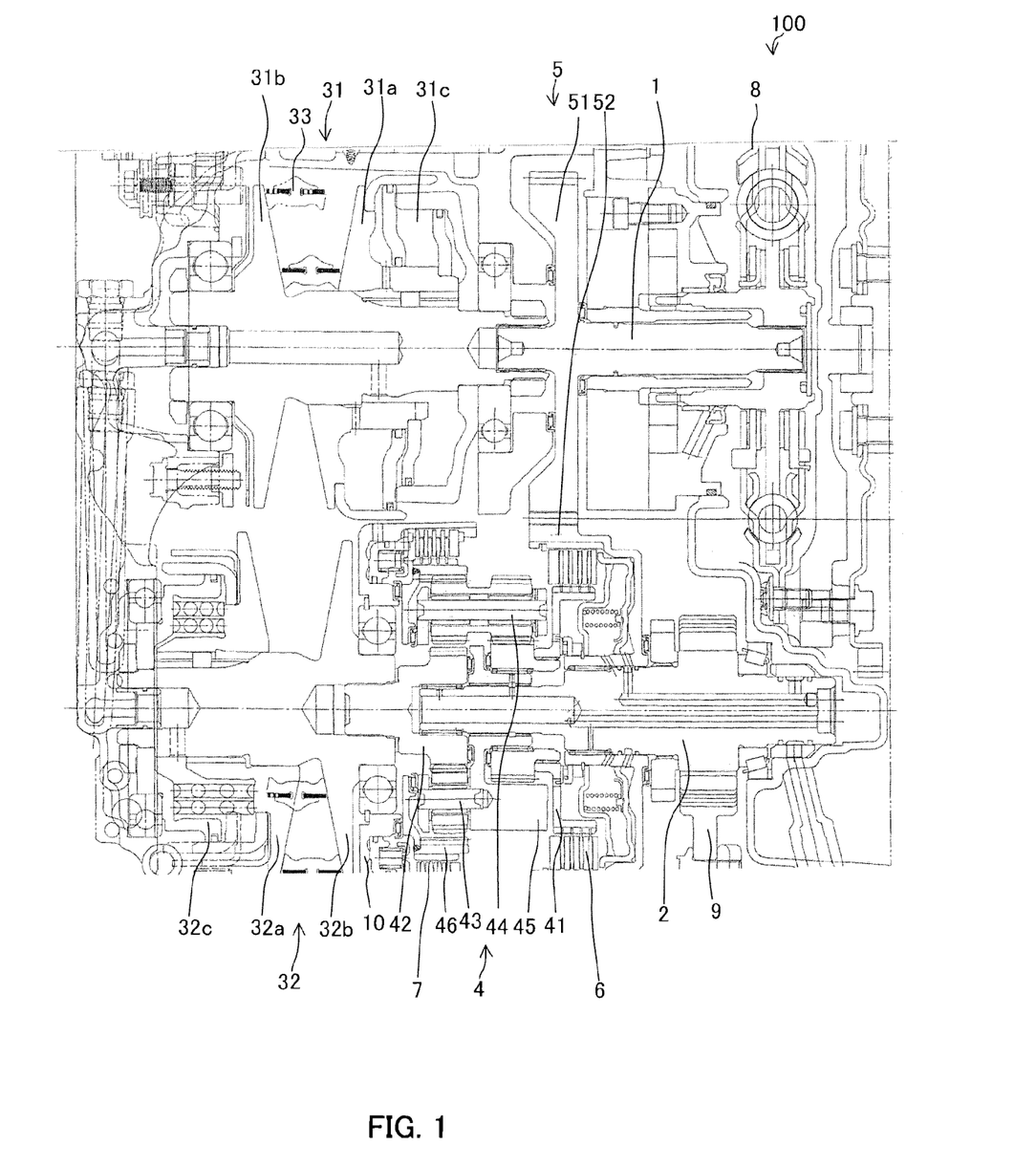
FIG. 1 is a schematic construction diagram of an automatic transmission according to a first embodiment of the present invention.
Figure 2:
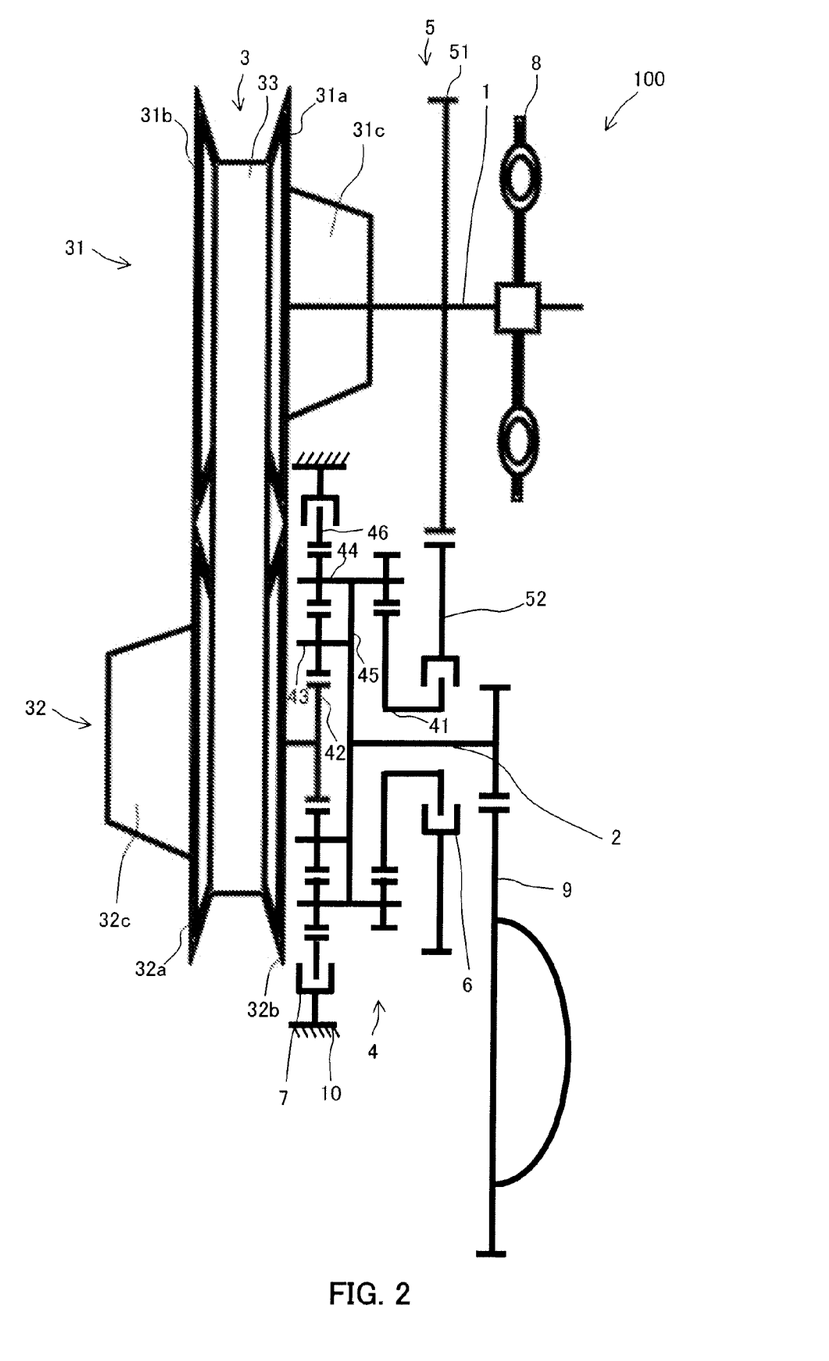
FIG. 2 is a skeleton diagram of the automatic transmission according to the first embodiment of the present invention.

FIG. 1 is a schematic construction diagram showing the construction of an automatic transmission 100 according to this embodiment. FIG. 2 is a skeleton diagram schematically showing the construction of the automatic transmission 100.

The automatic transmission 100 includes an input shaft 1, an output shaft 2, a continuously variable transmission mechanism 3, a planetary gear mechanism 4, a coupling member 5, a clutch 6 and a brake 7.

The input shaft 1 is coupled to a primary pulley 31 of the continuously variable transmission mechanism 3 to transmit a torque input from a drive source such as an engine via a torque converter 8 to the continuously variable transmission mechanism 3.

The output shaft 2 transmits a drive force varied in its amount and combined in the continuously variable transmission mechanism 3 and the planetary gear mechanism 4 to drive wheels of a vehicle via a differential gear 9.

The continuously variable transmission mechanism 3 includes a primary pulley 31 as an input unit, a secondary pulley 32 as an output unit and a belt 33.

The primary pulley 31 is an input shaft side pulley for inputting rotation of the drive source to the continuously variable transmission mechanism 3. The primary pulley 31 includes a fixed conical plate 31b and a movable conical plate 31a. The fixed conical plate 31b rotates together with the input shaft 1. The movable conical plate 31a is arranged to face the fixed conical plate 31b and form a V-shaped pulley groove, and is displaceable in an axial direction by hydraulic pressure acting on a primary pulley cylinder chamber 31c. The primary pulley cylinder chamber 31c is arranged on an input shaft side (right side in FIG. 1) of the primary pulley 31.

The belt 33 is mounted between the primary pulley 31 and the secondary pulley 32 and transmits the rotation of the primary pulley 31 to the secondary pulley 32. The belt 33 may be a V-belt formed by connecting a multitude of elements by a band-like belt or may be a chain belt formed by connecting a multitude of blocks in a band-like manner by links and pins.

The secondary pulley 32 is an output shaft side pulley for outputting the rotation transmitted by the belt 33. The secondary pulley 32 includes a fixed conical plate 32b and a movable conical plate 32a. The fixed conical plate 32b rotates together with the output shaft 2. The movable conical plate 32a is arranged to face the fixed conical plate 32b and form a V-shaped pulley groove, and is displaceable in an axial direction according to hydraulic pressure acting on a secondary pulley cylinder chamber 32c. The secondary pulley cylinder chamber 32c is arranged on a side (left side in FIG. 1) opposite to the output shaft side of the secondary pulley 32.

The planetary gear mechanism 4 is a Ravigneaux planetary gear mechanism 4 and includes a first sun gear 41, a second sun gear 42, a carrier 45 and a ring gear 46. The second sun gear 42 is coupled to the secondary pulley 32 of the continuously variable transmission mechanism 3. The carrier 45 supports a short pinion gear 43 engaged with the second sun gear 42 and a long pinion gear 44 engaged with the short pinion gear 43. The ring gear 46 is engaged with the long pinion gear 44.

The coupling member 5 includes a first coupling gear 51 coupled to the input shaft 1 and a second coupling gear 52 engaged with the first coupling gear 51. The coupling member 5 changes the rotational speed of the input shaft 1 according to a gear ratio (constant value) of the first coupling gear 51 to the second coupling gear 52 and transmits the rotation of the input shaft 1 to the first sun gear 41. The gear ratio of the first coupling gear 51 to the second coupling gear 52 is described later.

The clutch 6 is an engagement element provided radially inwardly of the second coupling gear 52 and capable of switching an engaged state of the first coupling gear 41 and the second coupling gear 52.

The brake 7 is a friction element fixed to a transmission case 10 and capable of locking the rotation of the ring gear 46.

Next, the operation of the automatic transmission 100 is described.

Figure 3:
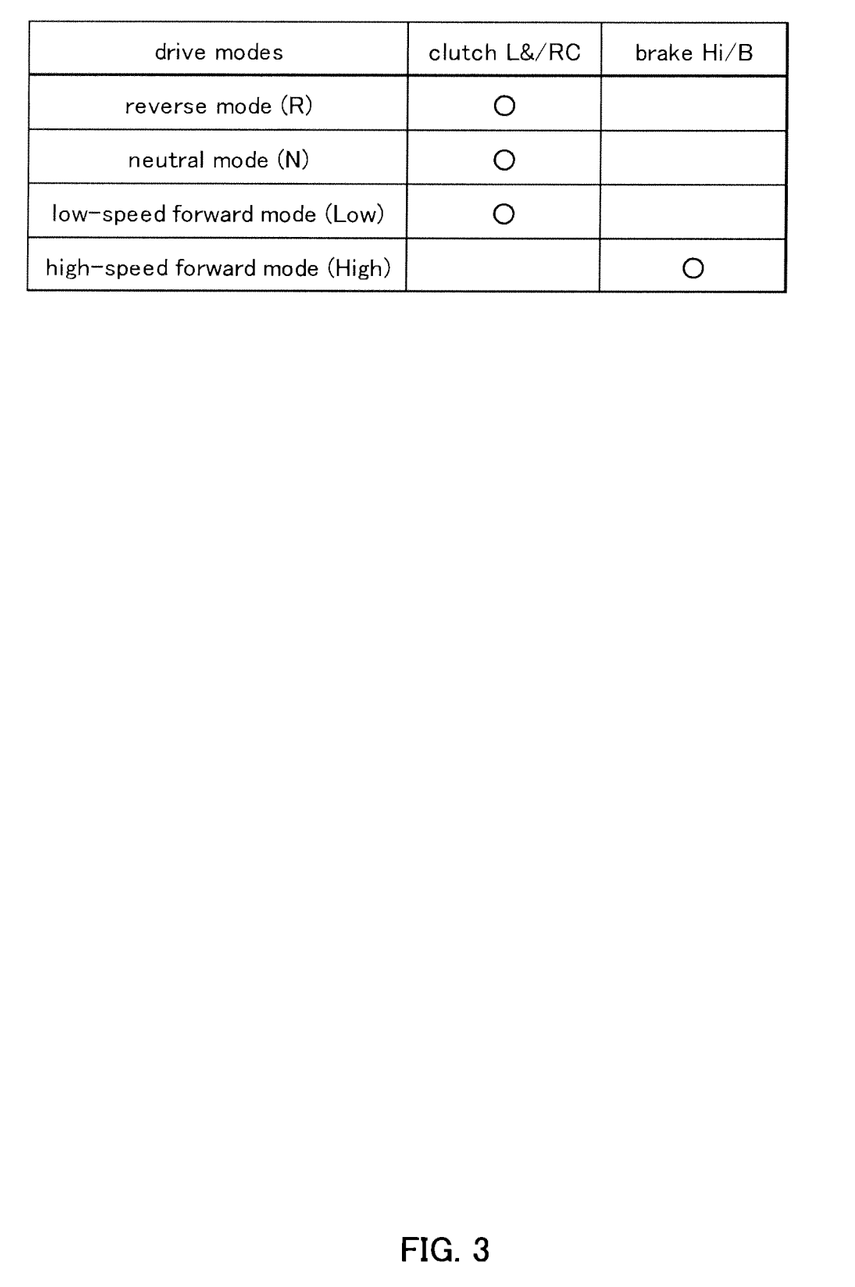
FIG. 3 is a table showing engaged states of a clutch and a brake.

FIG. 3 is a table showing a relationship between drive modes and engaged states of the clutch 6 and the brake 7. The automatic transmission 100 has four modes, i.e. a reverse mode, a neutral mode, a low-speed forward mode and a high-speed forward mode. The reverse mode is set in the case of reverse drive. The neutral mode is set when the vehicle is stopped. The low-speed forward mode is set in the case of forward drive at a low speed. The high-speed forward mode is set in the case of forward drive at a high speed.

When the clutch 6 is engaged and the brake 7 is released, the reverse mode, the neutral mode and the low-speed forward mode are realized. When the brake 7 is engaged and the clutch 6 is released, the high-speed forward mode is realized.

Figure 4:
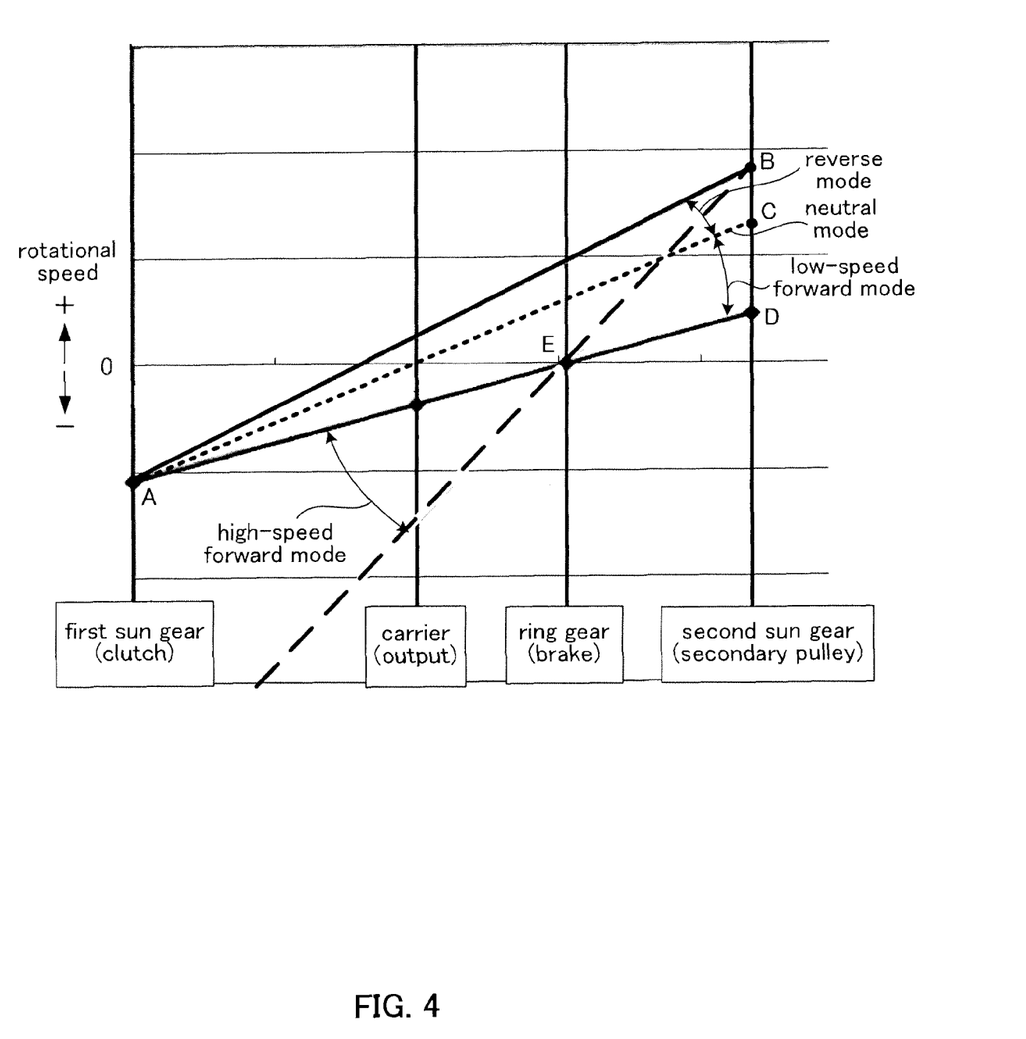
FIG. 4 is a speed diagram (alignment chart) of a planetary gear mechanism in the first embodiment.

FIG. 4 is a speed diagram showing a relationship between the four rotation elements of the planetary gear mechanism 4 and the rotational speeds of the respective elements. The planetary gear mechanism 4 is composed of the four rotation elements of the first sun gear 41, the carrier 45, the ring gear 46 and the second sun gear 42 shown from left in the speed diagram. Distances between the respective rotation elements (horizontal axis of FIG. 4) are specified according to gear ratios between the respective rotation elements.

Since the rotation of the input shaft 1 is transmitted to the first sun gear 41 via the first and second coupling gears 51, 52, the first sun gear 41 constantly rotates in a direction opposite to the input shaft 1. Since being coupled to the secondary pulley 32, the second sun gear 42 constantly rotates in the same direction as the input shaft 1. The rotational speed of the carrier 45 and the ring gear 46 are specified according to the rotational speed of the first sun gear 41 and that of the second sun gear 42.

As shown in FIG. 4, a line turns about a point A when the clutch 6 is engaged and the brake 7 is released. The rotational speed of the second sun gear 42 varies according to a speed ratio (a ratio of a rotation speed of the primary pulley 31 to a rotation speed of the secondary pulley 32) of the continuously variable transmission mechanism 3 and reaches a point D at a realizable maximum speed ratio while reaching a point B at a realizable minimum speed ratio. That is, the line turns from a line A-B to a line A-D.

The gear ratio of the first coupling gear 51 to the second coupling gear 52 is so set in advance that the rotational speed of the carrier 45 coupled to the output shaft becomes positive (forward direction relative to the second sun gear 42) and negative (reverse direction relative to the second sun gear 42) while crossing zero when the line turns from the line A-B to the line A-D.

On the other hand, the line turns about a point E when the clutch 6 is released and the brake 7 is engaged. The rotational speed of the second sun gear 42 varies between the points B and D according to the speed ratio of the continuously variable transmission mechanism 3 as described above. That is, the line turns from a line E-B to a line E-D.

In this case, the rotational speed of the carrier 45 coupled to the output shaft 2 is constantly negative (reverse direction relative to the second sun gear 42) and increases in a negative direction as compared with the case where the clutch 6 is engaged.

The respective drive modes are described below.

When the drive mode is the reverse mode, the clutch 6 is engaged and the brake 7 is released. The first sun gear 41 is coupled to the second coupling gear 52 and the rotational speed of the first sun gear 41 is specified by the rotational speed of the input shaft 1. The speed ratio of the continuously variable transmission mechanism 3 is set to be higher than a predetermined intermediate speed ratio and the rotational speed of the second sun gear 42 increases. The predetermined intermediate speed ratio is set according to the rotational speed of the input shaft 1 so that the rotational speed of the carrier 45 is higher than zero.

As shown in the speed diagram of FIG. 4, the rotational speed of the first sun gear 41 is at the point A and the rotational speed of the second sun gear 42 changes in the range of the point B to the point C according to the speed ratio of the continuously variable transmission mechanism. This causes a line segment to turn about the point A. Since the rotational speed of the carrier 45 is a value larger than 0, the output shaft 2 rotates in a direction to drive the vehicle backward. The reverse travel speed of the vehicle can be set at a desired speed by changing the speed ratio of the continuously variable transmission mechanism 3.

When the drive mode is the neutral mode, the clutch 6 is engaged and the brake 7 is released. The first sun gear 41 is engaged with the second coupling gear 52 and the rotational speed of the first sun gear 41 is specified by the rotational speed of the input shaft 1. The speed ratio of the continuously variable transmission mechanism 3 is set to the predetermined intermediate speed ratio. In this way, the rotational speed of the second sun gear 42 becomes lower than in the case of the reverse mode and the rotational speed of the carrier becomes zero.

As shown in the speed diagram of FIG. 4, the rotational speed of the first sun gear 41 is at the point A, the rotational speed of the second sun gear 42 is at the point C corresponding to the intermediate speed ratio of the continuously variable transmission mechanism 3, and the line segment stops in a state shown by dotted line (line A-C). Since the rotational speed of the carrier 45 becomes zero, the vehicle is kept in a stopped state. In this case, since the input shaft 1 is rotating, but the output shaft 2 is stopped, the speed ratio of the automatic transmission 100 as a whole is infinite.

When the drive mode is the low-speed forward mode, the clutch 6 is engaged and the brake 7 is released. The first sun gear 41 is engaged with the second coupling gear 52 and the rotational speed of the first sun gear 41 is specified by the rotational speed of the input shaft 1. The speed ratio of the continuously variable transmission mechanism 3 is set to be lower than the predetermined intermediate speed ratio. The rotational speed of the second sun gear 42 is further lower than in the case of the neutral mode.

As shown in the speed diagram of FIG. 4, the rotational speed of the first sun gear 41 is at the point A and the rotational speed of the second sun gear 42 changes in the range of the point C to the point D. This causes the line segment to turn about the point A. Since the rotational speed of the carrier 45 is a value smaller than 0, the output shaft 2 rotates in a direction to drive the vehicle forward. The forward travel speed of the vehicle can be set at a desired speed by changing the speed ratio of the continuously variable transmission mechanism 3.

When the drive mode is the high-speed forward mode, the clutch 6 is released and the brake 7 is engaged. The rotation of the ring gear 46 is locked and the rotational speed thereof is kept at zero. The first sun gear 41 and the second coupling gear 52 are disengaged, and the first sun gear 41 rotates following the rotation of the long pinion gear 44. If the speed ratio of the continuously variable transmission mechanism 3 is changed to be higher in this state, the rotational speed of the second sun gear 42 increases.

As shown in the speed diagram of FIG. 4, the line segment turns about the point E according to the rotational speed of the second sun gear from a state connecting the points A and D (line A-D). The rotational speed of the carrier 45 is reduced to be considerably lower than zero and the output shaft 2 rotates at a high speed in the direction to drive the vehicle forward. The forward travel speed of the vehicle can be set at a desired speed by changing the speed ratio of the continuously variable transmission mechanism 3.

Out of the above drive modes, the reverse mode, the neutral mode and the low-speed forward mode can be switched only by changing the speed ratio of the continuously variable transmission mechanism 3 without changing the engaged states of the clutch 6 and the brake 7. On the other hand, a switch between the low-speed forward mode and the high-speed forward mode is made by switching the engaged states of the clutch 6 and the brake 7.

The switch between the low-speed forward mode and the high-speed forward mode is made at a predetermined mode switch speed ratio (e.g. maximum speed ratio). The gear ratio between the first and second coupling gears 51, 52 is so set in advance that the rotational speed of the input shaft 1 is equal regardless of whether the low-speed forward mode or the high-speed forward mode is set when the speed ratio of the continuously variable transmission mechanism 3 is set at the predetermined mode switch speed ratio.

This can prevent the occurrence of a shock caused by a rotational speed difference when the mode is switched between the low-speed forward mode and the high-speed forward mode and the engaged states of the clutch and the brake are switched. Thus, the drive modes can be smoothly switched.

In this embodiment, the rotation direction of the output shaft 2 can be changed from the forward direction to the reverse direction relative to the second sun gear 42 by setting the clutch 6 in the engaged state and changing the speed ratio of the continuously variable transmission mechanism 3.

Since the drive mode can be set to the reverse mode, the neutral mode and the low-speed forward mode in this way, forward and reverse drives can be enabled without providing a friction element exclusively used for reverse drive. Therefore, a cost increase and enlargement of the transmission can be suppressed.

The gear ratio of the coupling member 5 is so set that the rotational speed of the first sun gear 41 in the low-speed forward mode and that of the first sun gear 41 in the high-speed forward mode are equal when the speed ratio of the continuously variable transmission mechanism 3 is set at the mode switch speed ratio. This can prevent the occurrence of a shock caused by a rotational speed difference when the switch is made between the low-speed forward mode and the high-speed forward mode.

Since the mode switch speed ratio is set at the maximum speed ratio of the continuously variable transmission mechanism 3, the switch between the low-speed forward mode and the high-speed forward mode can be made at a lower speed as compared with the case where the mode switch speed ratio is not set at the maximum speed ratio. Further, a possible speed ratio range of the automatic transmission 100 can be increased.

Since the hydraulic chamber 31c of the primary pulley 31 is provided on a side of the planetary gear mechanism 4 and the hydraulic chamber 32c of the secondary pulley 32 is provided on a side opposite to the planetary gear mechanism 4, the axial length of the entire automatic transmission 100 can be shortened. Further, since the secondary pulley 32 and the coupling member 5 are respectively coupled to the two sun gears 41, 42 of the planetary gear mechanism 4 from the outside of the planetary gear mechanism 4, the axial length of the entire automatic transmission 100 can be further shortened.

Next, a second embodiment is described.

This embodiment differs from the first embodiment only in the structure of a planetary gear mechanism 80 and the relationship between the drive modes shown in FIG. 3 and the engaged states of the clutch 6 and the brake 7 is same.

Figure 5:
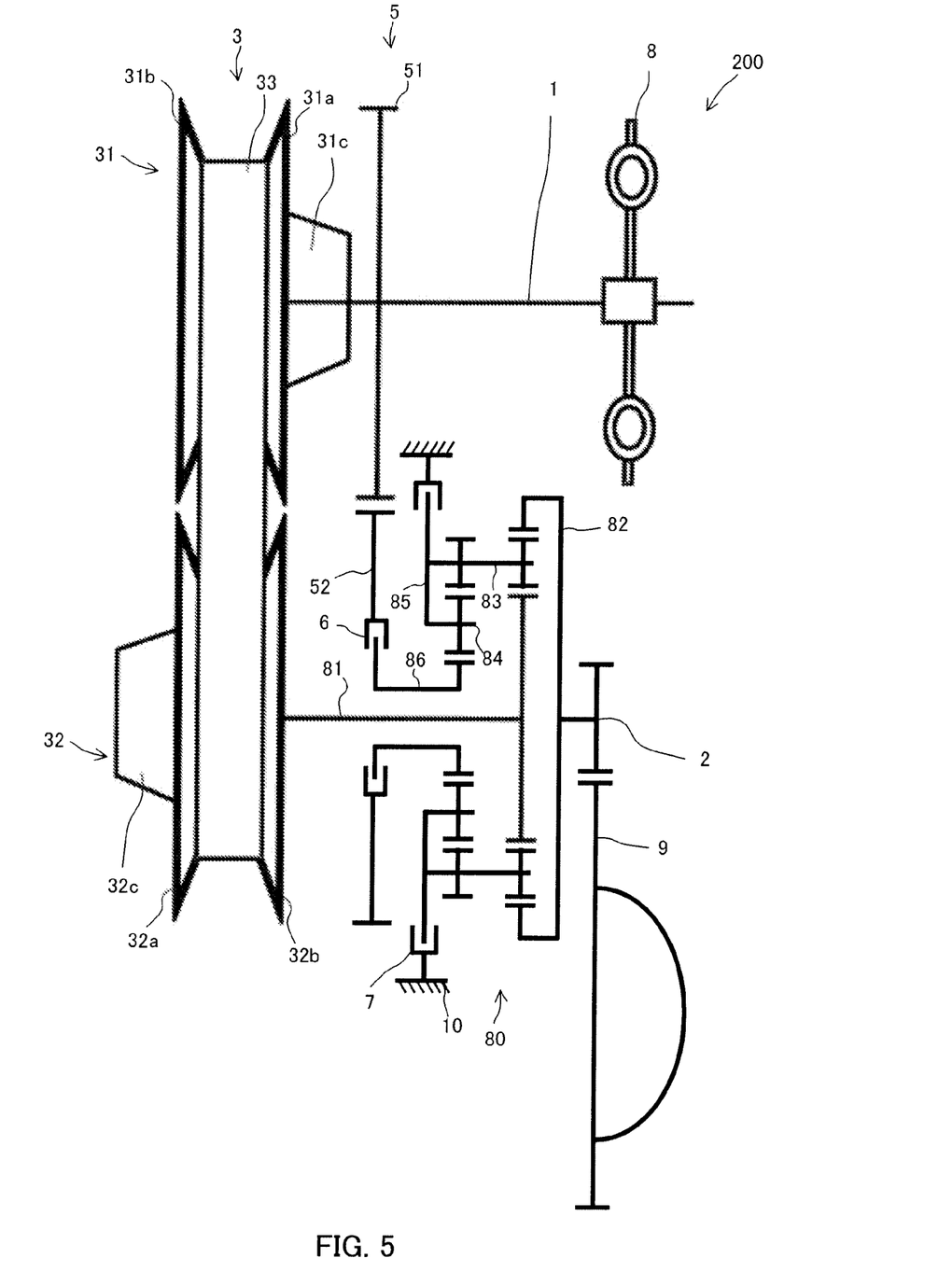
FIG. 5 is a skeleton diagram of an automatic transmission according to a second embodiment of the present invention.

FIG. 5 is a skeleton diagram schematically showing the construction of an automatic transmission 200 in this embodiment.

The planetary gear mechanism 80 of this embodiment is a Ravigneaux planetary gear mechanism and includes a first sun gear 81, a ring gear 82, a carrier 85 and a second sun gear 86. The first sun gear 81 is coupled to a secondary pulley 32. The ring gear 82 is coupled to an output shaft 2. The carrier 85 supports a long pinion gear 83 engaged with the first sun gear 81 and the ring gear 82 and a short pinion gear 84 engaged with the long pinion gear 83. The second sun gear 86 is engaged with the short pinion gear 84.

A coupling member 5 includes a first coupling gear 51 coupled to an input shaft 1 and a second coupling gear 52 engaged with the first coupling gear 51. The coupling member 5 changes the rotational speed of the input shaft 1 according to a gear ratio (constant value) of the first coupling gear 51 to the second coupling gear 52 and transmits the rotation of the input shaft 1 to the second sun gear 86. The gear ratio of the first coupling gear 51 to the second coupling gear 52 is described later.

A clutch 6 is an engagement element provided radially inwardly of the second coupling gear 52 and capable of switching an engaged state of the second sun gear 86 and the second coupling gear 52.

A brake 7 is a friction element fixed to a transmission case 10 and capable of locking the rotation of the carrier 85.

Next, the operation of the automatic transmission 200 is described.

Figure 6:
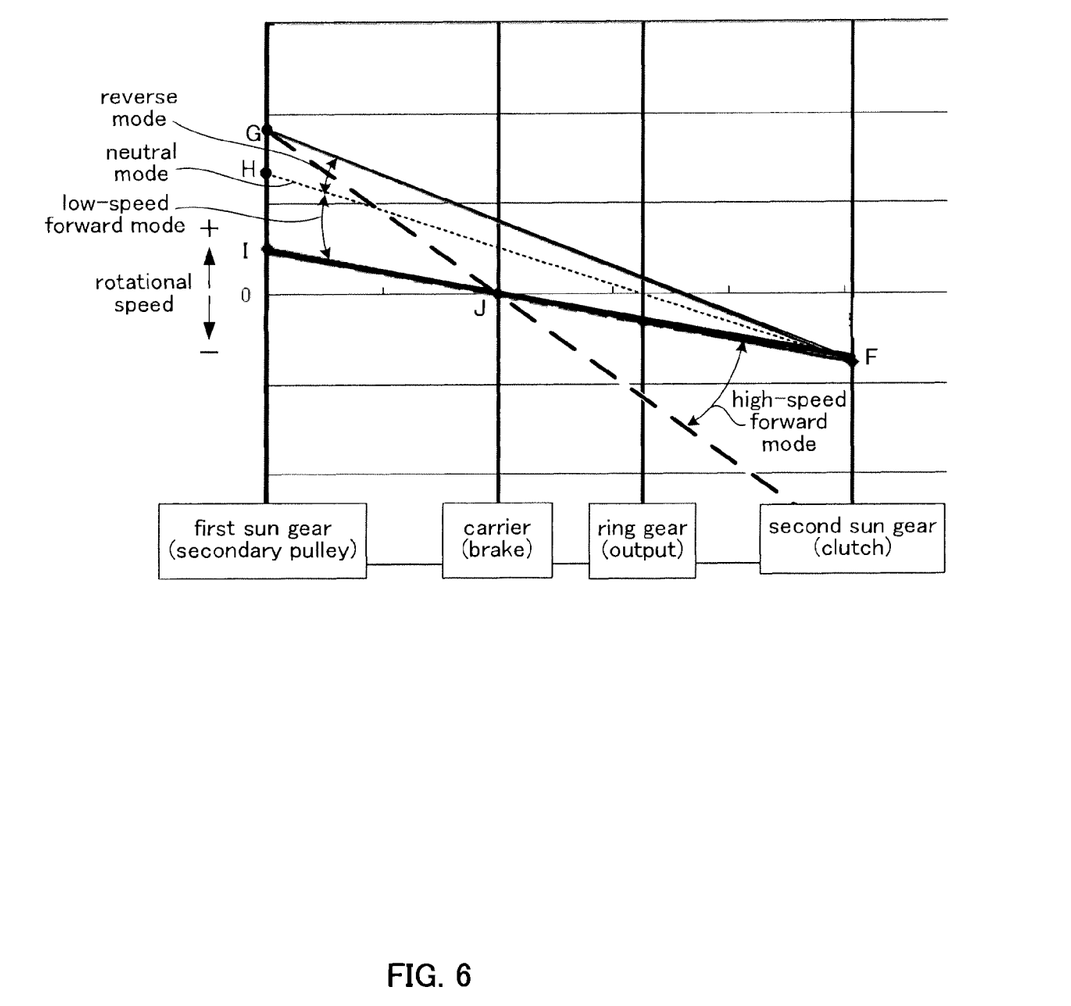
FIG. 6 is a speed diagram (alignment chart) of a planetary gear mechanism in the second embodiment.

FIG. 6 is a speed diagram showing a relationship between the four rotation elements of the planetary gear mechanism 80 and the rotational speeds of the respective elements. The planetary gear mechanism 80 of this embodiment is composed of the four rotation elements of the first sun gear 81, the carrier 85, the ring gear 82 and the second sun gear 86 shown from left in the speed diagram. Distances between the respective rotation elements (horizontal axis of FIG. 6) are specified according to gear ratios between the respective rotation elements.

Since being coupled to the secondary pulley 32, the first sun gear 81 constantly rotates in a forward direction relative to the input shaft 1. Since the rotation of the input shaft 1 is transmitted to the second sun gear 86 via the first and second coupling gears 51, 52, the second sun gear 86 constantly rotates in a reverse direction relative to the input shaft 1. The carrier 85 and the ring gear 82 are specified according to the rotational speed of the first sun gear 81 and that of the second sun gear 86.

As shown in FIG. 6, a line turns about a point F when the clutch 6 is engaged and the brake 7 is released. The rotational speed of the first sun gear 81 varies according to a speed ratio (a ratio of a rotation speed of the primary pulley 31 to a rotation speed of the secondary pulley 32) of a continuously variable transmission mechanism 3 and reaches a point I at a realizable maximum speed ratio while reaching a point G at a minimum speed ratio. That is, the line turns from a line F-G to a line F-I.

The gear ratio of the first coupling gear 51 to the second coupling gear 52 is so set in advance that the rotational speed of the ring gear 82 coupled to the output shaft 2 becomes positive (forward direction relative to the first sun gear 81) and negative (reverse direction relative to the first sun gear 81) while crossing zero when the line turns from the line F-G to the line F-I.

On the other hand, the line turns about a point J when the clutch 6 is released and the brake 7 is engaged. The rotational speed of the first sun gear 81 varies between the points G and I according to the speed ratio of the continuously variable transmission mechanism 3 as described above. In this case, the rotational speed of the ring gear 82 coupled to the output shaft 2 is constantly negative (reverse direction relative to the first sun gear 81) and increases in a negative direction as compared with the case where the clutch 6 is engaged.

The respective drive modes are described below.

When the drive mode is the reverse mode, the clutch 6 is engaged and the brake 7 is released. The second sun gear 86 is coupled to the second coupling gear 52 and the rotational speed of the second sun gear 86 is specified by the rotational speed of the input shaft 1. The speed ratio of the continuously variable transmission mechanism 3 is set to be higher than a predetermined intermediate speed ratio. In this way, the rotational speed of the first sun gear 81 increases. The predetermined intermediate speed ratio is set according to the rotational speed of the input shaft 1 so that the rotational speed of the ring gear 82 is higher than zero similar to the first embodiment.

As shown in the speed diagram of FIG. 6, the rotational speed of the second sun gear 86 is at the point F and the rotational speed of the first sun gear 81 changes in the range of the point G to the point H according to the speed ratio of the continuously variable transmission mechanism 3. This causes a line segment to turn about the point F. Since the rotational speed of the ring gear 82 is a value larger than 0, the output shaft 2 rotates in a direction to drive the vehicle backward. The reverse travel speed of the vehicle can be set at a desired speed by changing the speed ratio of the continuously variable transmission mechanism 3.

When the drive mode is the neutral mode, the clutch 6 is engaged and the brake 7 is released. The second sun gear 86 is engaged with the second coupling gear 52 and the rotational speed of the second sun gear 86 is specified by the rotational speed of the input shaft 1. The speed ratio of the continuously variable transmission mechanism 3 is set to the predetermined intermediate speed ratio. In this way, the rotational speed of the first sun gear 81 becomes lower than in the case of the reverse mode.

As shown in the speed diagram of FIG. 6, the rotational speed of the second sun gear 86 is at the point F, the rotational speed of the first sun gear 81 is at the point H corresponding to the intermediate speed ratio of the continuously variable transmission mechanism 3, and the line segment stops in a state shown by dotted line (line F-H). Since the rotational speed of the ring gear 82 becomes zero, the vehicle can be kept in a stopped state. In this case, since the input shaft 1 is rotating, but the output shaft 2 is stopped, the speed ratio of the automatic transmission 200 as a whole is infinite.

When the drive mode is the low-speed forward mode, the clutch 6 is engaged and the brake 7 is released. The second sun gear 86 is engaged with the second coupling gear 52 and the rotational speed of the second sun gear 86 is specified by the rotational speed of the input shaft 1. The speed ratio of the continuously variable transmission mechanism 3 is set to be lower than the predetermined intermediate speed ratio. In this way, the rotational speed of the first sun gear 81 is reduced further than in the case of the neutral mode.

As shown in the speed diagram of FIG. 6, the rotational speed of the second sun gear 86 is at the point F and the rotational speed of the first sun gear 81 changes in the range of the point H to the point I. This causes the line segment to turn about the point F. Since the rotational speed of the ring gear 82 is a value smaller than 0, the output shaft 2 rotates in a direction to drive the vehicle forward. The forward travel speed of the vehicle can be set at a desired speed by changing the speed ratio of the continuously variable transmission mechanism 3.

When the drive mode is the high-speed forward mode, the clutch 6 is released and the brake 7 is engaged. The rotation of the carrier 85 is locked and the rotational speed thereof is kept at zero. The second sun gear 86 and the second coupling gear 52 are disengaged, and the second sun gear 86 rotates following the rotation of the short pinion gear 84. If the speed ratio of the continuously variable transmission mechanism 3 is changed to be higher in this state, the rotational speed of the first sun gear 81 increases.

As shown in the speed diagram of FIG. 6, the line segment turns about the point J according to the rotational speed of the first sun gear 81 from a state connecting the points F and I. The rotational speed of the ring gear 82 is reduced to be considerably lower than zero and the output shaft 2 rotates at a high speed in the direction to drive the vehicle forward. The forward travel speed of the vehicle can be set at a desired speed by changing the speed ratio of the continuously variable transmission mechanism 3.

Out of the above drive modes, the reverse mode, the neutral mode and the low-speed forward mode can be switched only by changing the speed ratio of the continuously variable transmission mechanism 3 without changing the engaged states of the clutch 6 and the brake 7. On the other hand, a switch between the low-speed forward mode and the high-speed forward mode is made by switching the engaged states of the clutch 6 and the brake 7.

Similar to the first embodiment, the switch between the low-speed forward mode and the high-speed forward mode is made at a predetermined mode switch speed ratio (e.g. maximum speed ratio). The gear ratio between the first and second coupling gears 51, 52 is so set in advance that the rotational speed of the input shaft 1 is same regardless of whether the low-speed forward mode or the high-speed forward mode is set when the speed ratio of the continuously variable transmission mechanism 3 is set at the predetermined mode switch speed ratio.

In this embodiment, the rotation direction of the output shaft 2 is changed from the forward direction to the reverse direction relative to the first sun gear 81 by setting the clutch 6 in the engaged state and changing the speed ratio of the continuously variable transmission mechanism 3. In this way, the drive mode can be set to the reverse mode, the neutral mode and the low-speed forward mode, and forward and reverse drives can be enabled without providing a friction element exclusively used for reverse drive.

The gear ratio of the coupling member 5 is so set that the rotational speed of the second sun gear 86 in the low-speed forward mode and that of the second sun gear 86 in the high-speed forward mode are equal when the speed ratio of the continuously variable transmission mechanism 3 is set at the mode switch speed ratio. This can prevent the occurrence of a shock caused by a rotational speed difference when the switch is made between the low-speed forward mode and the high-speed forward mode.

Since the mode switch speed ratio is set at the maximum speed ratio of the continuously variable transmission mechanism 3, the switch between the low-speed forward mode and the high-speed forward mode can be made at a lower speed as compared with the case where the mode switch speed ratio is not set at the maximum speed ratio. Further, a possible speed ratio range of the automatic transmission 200 can be increased.

An embodiment of this invention was described above, but the above embodiment merely illustrates one example of application of the invention, and the technical scope of the invention is not limited to the specific constitutions of the above embodiment.

For example, although the continuously variable transmission mechanism 3 has been described taking a belt continuously variable transmission as an example in the first and second embodiments, it may be another continuously variable transmission mechanism if the speed ratio can be continuously changed.

Although the mode switch speed ratio is set at the maximum speed ratio of the continuously variable transmission mechanism 3 in the first and second embodiments, a higher speed ratio may be set as the mode switch speed ratio.

Although the coupling member 5 is structurally composed of the first and second coupling gears 51, 52 in the first and second embodiments, any structure in which input rotation to the primary pulley 31 and that to the planetary gear mechanism 4, 80 via the coupling member 5 are opposite may be employed and the coupling member 5 may be replaced, for example, by a chain or the like.

What is claimed is:

1. An automatic transmission which changes a rotational speed of an input shaft and transmits rotation of the input shaft to an output shaft, comprising:
    a continuously variable transmission mechanism which continuously changes a rotational speed ratio of an input unit to an output unit;
    a planetary gear mechanism including at least four rotation elements including a first rotation element, a second rotation element, a third rotation element and a fourth rotation element, wherein, amongst the respective rotation elements, rotational speed is lowest in the first rotation element, greater in the second rotation element, greater yet in the third rotation element, and greatest in the fourth rotation element;
    a clutch which causes the input shaft and the first rotation element to be engaged;
    a coupling member which changes the rotational speed of the input shaft at a constant speed ratio and transmits the rotation of the input shaft to the first rotation element via the clutch; and
    a brake which locks rotation of the third rotation element, wherein:
    the input shaft is coupled to the input unit, the output shaft is coupled to the second rotation element, the output unit is coupled to the fourth rotation element;
    the constant speed ratio of the coupling member is so set that a rotation direction of the output shaft relative to the fourth rotation element changes from a forward direction to a reverse direction according to a change in the speed ratio of the continuously variable transmission mechanism when the clutch is engaged and the brake is released;
    the continuously variable transmission mechanism is a belt continuously variable transmission constructed such that a belt is mounted between a primary pulley as the input unit and a secondary pulley as the output unit and movable sheaves of the respective pulleys are displaced to change the speed ratio by controlling supply pressures to hydraulic chambers of the respective pulleys;
    the planetary gear mechanism is a Ravigneaux planetary gear mechanism including a first sun gear as the first rotation element, a second sun gear as the fourth rotation element, a ring gear as the third rotation element and a carrier supporting a long pinion gear engaged with the first sun gear and the ring gear and a short pinion gear engaged with the second sun gear and the long pinion gear as the second rotation element;
    the second sun gear is coupled to the secondary pulley on a continuously variable transmission mechanism side of the planetary gear mechanism;
    the input shaft is coupled to the primary pulley on a planetary gear mechanism side of the primary pulley;
    the first sun gear is coupled to the input shaft via the coupling member on a side of the planetary gear mechanism opposite to the continuously variable transmission mechanism side;
    the output shaft is arranged radially inwardly of the first sun gear and coupled to the carrier between the first sun gear and the second sun gear;
    the hydraulic chamber of the primary pulley is provided on the planetary gear mechanism side of the primary pulley; and
    the hydraulic chamber of the secondary pulley is arranged on a side of the secondary pulley opposite to a planetary gear mechanism side.

2. The automatic transmission as defined in claim 1, wherein the constant speed ratio of the coupling member is so set that the rotational speed of the first rotation element is equal in a first mode in which the clutch is engaged, the brake is released and the rotational speed of the output shaft is changed according to the change in the speed ratio of the continuously variable transmission mechanism and a second mode in which the clutch is released, the brake is engaged and the rotational speed of the output shaft is changed according to the change in the speed ratio of the continuously variable transmission mechanism when the speed ratio of the continuously variable transmission mechanism is set at a predetermined mode switch speed ratio.

3. The automatic transmission as defined in claim 2, wherein the mode switch speed ratio is a highest speed ratio realizable by the continuously variable transmission mechanism.

* * * * *